(12) United States Patent  (10) Patent No.: US 6,585,325 B1
Pal  (45) Date of Patent: Jul. 1, 2003

(54) SEAT WITH AN INTEGRAL SEATBELT

(75) Inventor: Chinmoy Pal, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 156 days.

(21) Appl. No.: 09/596,072

(22) Filed: Jun. 16, 2000

(30) Foreign Application Priority Data

Jun. 18, 1999 (JP) ............................................. 11-172968

(51) Int. Cl.$^7$ ................................................ B60R 22/26
(52) U.S. Cl. ................................... 297/483; 297/452.2
(58) Field of Search ................................. 297/483, 484, 297/452.18, 452.2; 280/808

(56) References Cited

U.S. PATENT DOCUMENTS

| 5,020,856 A | * | 6/1991 | George | 297/483 |
| 5,609,396 A | * | 3/1997 | Loxton et al. | 297/464 |
| 5,658,051 A | * | 8/1997 | Vega et al. | 297/483 |
| 5,681,081 A | * | 10/1997 | Lindner et al. | 280/808 |
| 5,823,627 A | * | 10/1998 | Viano et al. | 297/483 |
| 5,868,452 A | * | 2/1999 | Grieger | 297/216.1 |
| 6,123,388 A | * | 9/2000 | Vits et al. | 297/483 |

FOREIGN PATENT DOCUMENTS

| JP | 53-115516 | 9/1978 |
| JP | 5-76913 | 10/1993 |
| JP | 11-278127 | 10/1999 |

* cited by examiner

Primary Examiner—Peter R. Brown
(74) Attorney, Agent, or Firm—Foley & Lardner

(57) ABSTRACT

A seat back frame (25) includes vertical longitudinal frames (27, 29) disposed in a left position and a right position to each other, and transverse frames (31, 33) linking the longitudinal frames (27, 29) to each other, a seatbelt retractor (35) is configured to provide an emergency locking, a seatbelt (5) is linked retractably to the seatbelt retractor (35) and provided with an engagement member (23), a locking member (21) fixed to a longitudinal frame (27) and configured to disengageably lock the engagement member (23), an upper part supporter (47) is provided at an upper part (27a) of the longitudinal frame (27) and configured to support the seatbelt (5) from the seatbelt retractor (35) to return, and the seatbelt retractor (35) and the upper part supporter (49) are arranged to transmit a load acting from the seatbelt (5) on the upper part supporter (47), in a compression direction of the longitudinal frame (27).

11 Claims, 16 Drawing Sheets

BEFORE COLLISION $M = F_H \times L$

COMPRESSION

COMPRESSION (b)

(CASE 1)

(CASE 2)

(CASE 3)

(CASE 4)

SEAT WITH AN INTEGRAL SEATBELT

BACKGROUND OF THE INVENTION

The present invention relates to a seat with an integral seatbelt, that is a seat having an integrated seatbelt apparatus.

A seat with an integral seatbelt of the past is disclosed in Japanese Utility Model Application Laid-Open Publication No. 53-115516. This publication shows a seat integrally provided with a seatbelt apparatus, in which a seatbelt extends, via a shoulder anchor at the top of a seat back, toward the bottom of the seat back, where its end is retractably wound in an emergency-locking seatbelt retractor which is adapted to exhibit an emergency locking function and provided at a rear lower part of a seat cushion on which a passenger is seated.

The seat with an integral seatbelt has such an arrangement that a load imposed on a shoulder belt of the seatbelt acts, via the seat back, as rotational torque to be born by a reclining device. In an occasional case, such as upon a front collision of the vehicle, if an excessive load is imposed on the seatbelt, there may be caused excessive rotational torque to act on the reclining devices. For the seat with an integral seatbelt, there however is ensured dispersion of such excessive rotational torque toward a floor of the vehicle body via seat sliding rail assembly, with necessary strength owing to great increase in thicknesses, such as of the seat sliding rail assembly, thus accompanying problems, for example, of resultant increase in weight as well as scaling up, such as of the seat sliding rail assembly.

Given the above, in Japanese Utility Model Application Laid-Open Publication No. 5-76913, there is a disclosure of a configuration in which also a seatbelt is supported by a seat back, but in which a seatbelt retractor (ELR) is incorporated in a door for rear seat. In this configuration, in occasional cases such as of a front-end collision of the vehicle, imposed loads on the seatbelt can be transmitted to the door for rear seat, and the above-noted problems are solved. However, because the retractor which takes up the seatbelt is built into the door for rear seat, in the case of a two-door vehicle, there is another problem such that the seatbelt must be removed from time to time, when entering the rear seat.

In contrast, in Japanese Patent Application No. 10-85760 (Japanese Patent Application Laid-Open Publication No. 11-278127, published Oct. 12, 1999, not a prior art), when excessive loads are imposed on a seatbelt, those on a lap belt of the seatbelt are forced to act on a seat back in a rearward direction of the vehicle, as a solution to the problem described.

SUMMARY OF THE INVENTION

However, in such examples, the degree of effectiveness can be influenced in dependence on the length of an associated link, and on a waist speed of the passenger as well as on the passenger's physique (i.e. size) or reclining angle of the back posture of the passenger. Additionally, because of the inertial force due to a mass of the seatbelt retractor disposed at the top of a seat back, upon a collision, a support point of the seatbelt may have an increased tendency to move forward, which constitutes a hindrance to the passenger's boarding, depending on the link length.

It is an object of the present invention to provide a seat with an integral seatbelt, wherein imposed loads on a seatbelt can be absorbed at seat back without the use of a special link, and with suppressed increase in weight as well as in size such as of seat sliding rail assembly.

An aspect of the present invention to achieve the object is a seat with an integral seatbelt, comprising a seat back frame including vertical longitudinal frames disposed in a left position and a right position to each other and linked respectively at lower parts thereof to a seat cushion frame end, and a transverse frame linking the longitudinal frames to each other, a seatbelt retractor attached to a lower part of a longitudinal frame and configured to provide an emergency locking, a seatbelt linked at one end thereof retractably to the seatbelt retractor, attached at another end thereof to the seat cushion frame end, and provided with an engagement member at an intermediate therebetween, a locking member fixed to the longitudinal frame or the seat cushion frame end and configured to disengageably lock the engagement member, and an upper part supporter provided at an upper part of the longitudinal frame having the seatbelt retractor attached to the lower part thereof, and configured to support the seatbelt from the seatbelt retractor to return, wherein the seatbelt retractor and the upper part supporter are arranged to transmit a load acting from the seatbelt on the upper part supporter, in a compression direction of the longitudinal frames.

BRIEF DESCRIPTION OF THE DRAWINGS

The above-noted and other features of the present invention will be apparent from the description of embodiments to follow, taking in combination with the accompanying drawings, of which:

FIG. 6D shows the pure compression load condition load distribution;

FIG. 13A showing the position on the neutral axis, FIG. 13B showing the compression side, FIG. 13C showing the pulling side, and FIG. 13D showing this embodiment;

DETAILED DESCRIPTION OF THE PREFERRED EMBODIMENTS

Preferred embodiments of the present invention are described in detail below, with references made to relevant accompanying drawings.

Figure 1:
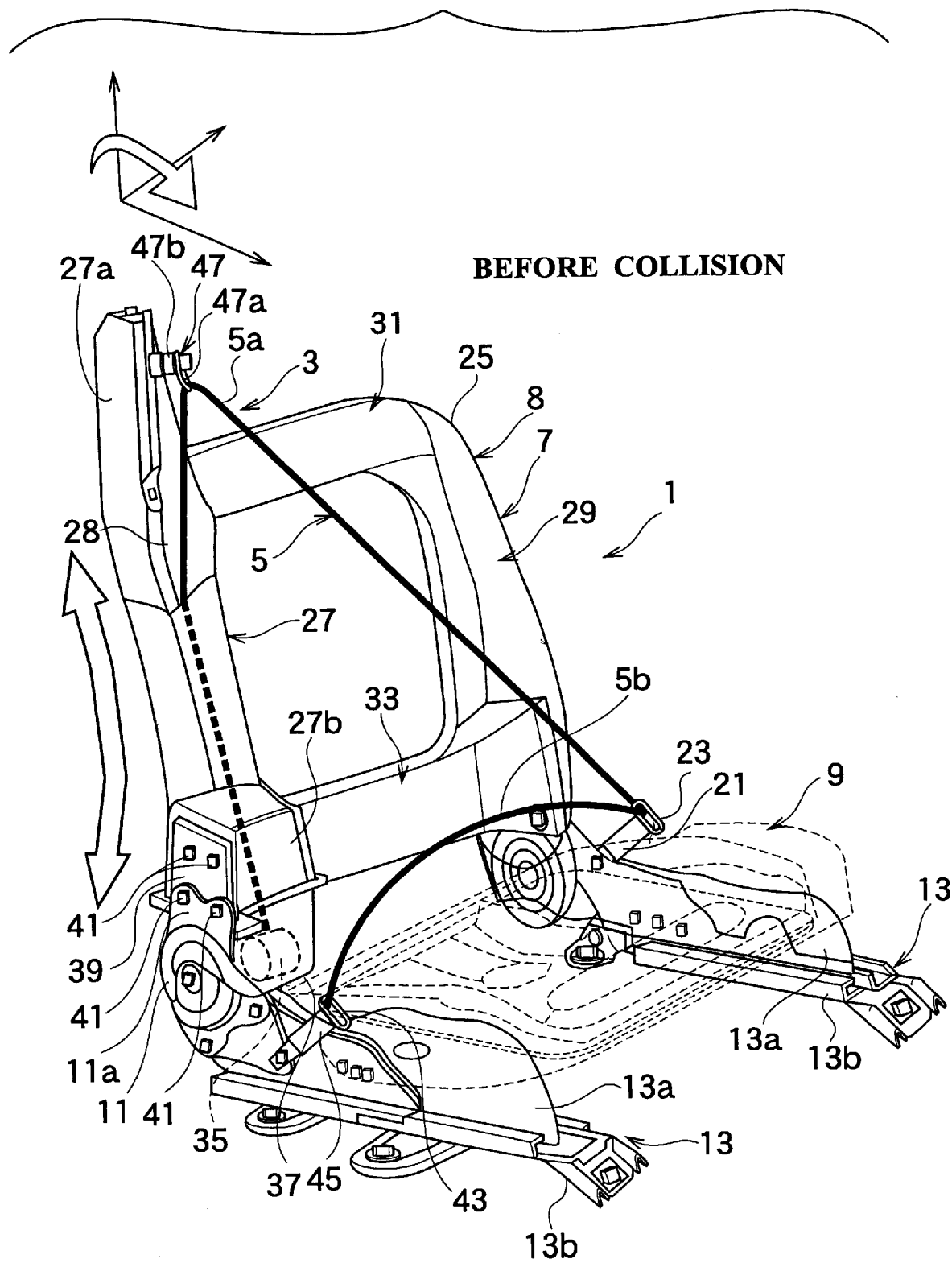
FIG. 1 is a partially simplified perspective view of a seat with an integral seatbelt according to a first embodiment of the present invention.

FIG. 1 is a partially simplified perspective view of a seat 1 with an integral seatbelt according to a first embodiment of the present invention.

In the embodiment shown in FIG. 1, a seat cushion 9 is shown by imaginary lines, omitting a seat back cushion for a seat back 7. In terms of overall configuration, the seat 1 with an integral seatbelt has the seat cushion 9, the seat back 7, and an integrated seatbelt apparatus 3.

The seat cushion 9 is fixed to upper sliding rails 13a, to the rear ends of which is fixed a lower end of a frame 25 of the seat back 7, via a reclining device 11. The reclining device 11 enables the seat back 7 to rotate front and back with respect to the seat cushion 9, and to be set in any of prescribed angular positions. Seat sliding rail assemblies 13 have their lower rails 13b fastened and fixed to a floor panel at a vehicle body end (not shown).

The frame 25 of the seat back 7 is integrally formed with a hollow, for example by aluminium or magnesium or any die-casting or assembly of plates forming a closed section, as a framework having longitudinal frames 27 and 29 and transverse frames 31 and 33.

The longitudinal frames 27 and 29 are positioned to the left and right of the seat back 7, and have lower parts thereof each fastened to the seat cushion side via the reclining device 11 and the upper sliding rails 13a. The transverse frames 31 and 33 extend transversely at the top and bottom of the seat back 7, and mutually join the longitudinal frames 27 and 29.

The upper part 27a of the right-side longitudinal frame 17 protrudes greater than the upper transverse frame 31. An aperture 28 is formed at the lower side of the upper transverse frame 31, on the front surface of the longitudinal frame 27.

On the lower part of one of the longitudinal frames 27 is mounted a seatbelt retractor (ELR) 35 that has an emergency locking function. This mounting is done via a load transmission member 37 mounted to the lower part of the longitudinal frames 27. On the lower part of the longitudinal frame 27 is fastened a recliner bracket 39 by four bolts and nuts 41, and an arm 11a of the reclining device 11 is mounted by means of the lower bolts and nuts 41.

The seatbelts 5 of the seatbelt apparatus 3 is fastened to the seatbelt retractor 35, to be freely taken up, and on the other end is mounted a tongue 43, which can be engaged with or disengaged from an outer buckle 45 that is mounted to the seat cushion frame side, this being the rear part of the upper sliding rails 13a. The tongue 23 can be locked and unlocked by an engagement device fitted within an inner buckle 21 mounted to the seat sliding rail 13a on the other side.

On the upper part 27 of the longitudinal frame to the lower part of which is mounted the seatbelt retractor 35 is provided an upper part supporter 47. The upper part supporter 47 provides a return point for and supports the seatbelt 5 that is pulled out from the seatbelt retractor 35 via the aperture 28. The upper part supporter 47 is formed by a through anchor 47a and a supporting member 47b that supports the through anchor 47a so that it freely rotates about its axis, the supporting member 47b being mounted to the upper part 27a of the longitudinal frame 27. The seatbelt 5 is supported so as to be able to move with respect to the through anchor 47a.

The mounting of the seatbelt retractor 35 via the load transmission member 37 is described below in further detail.

Figure 2:
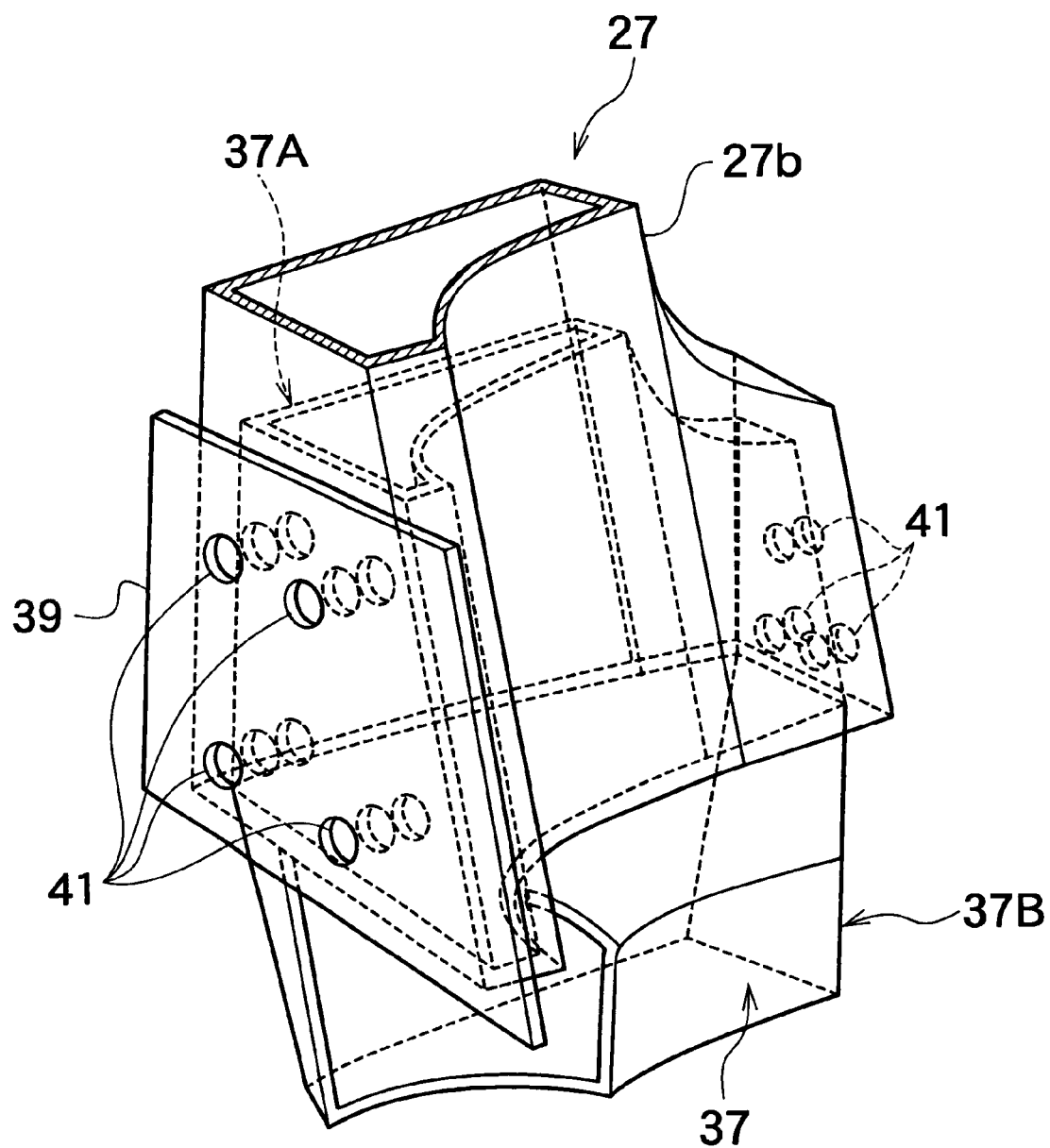
FIG. 2 is a perspective view of the main parts of the first embodiment.
Figure 3:
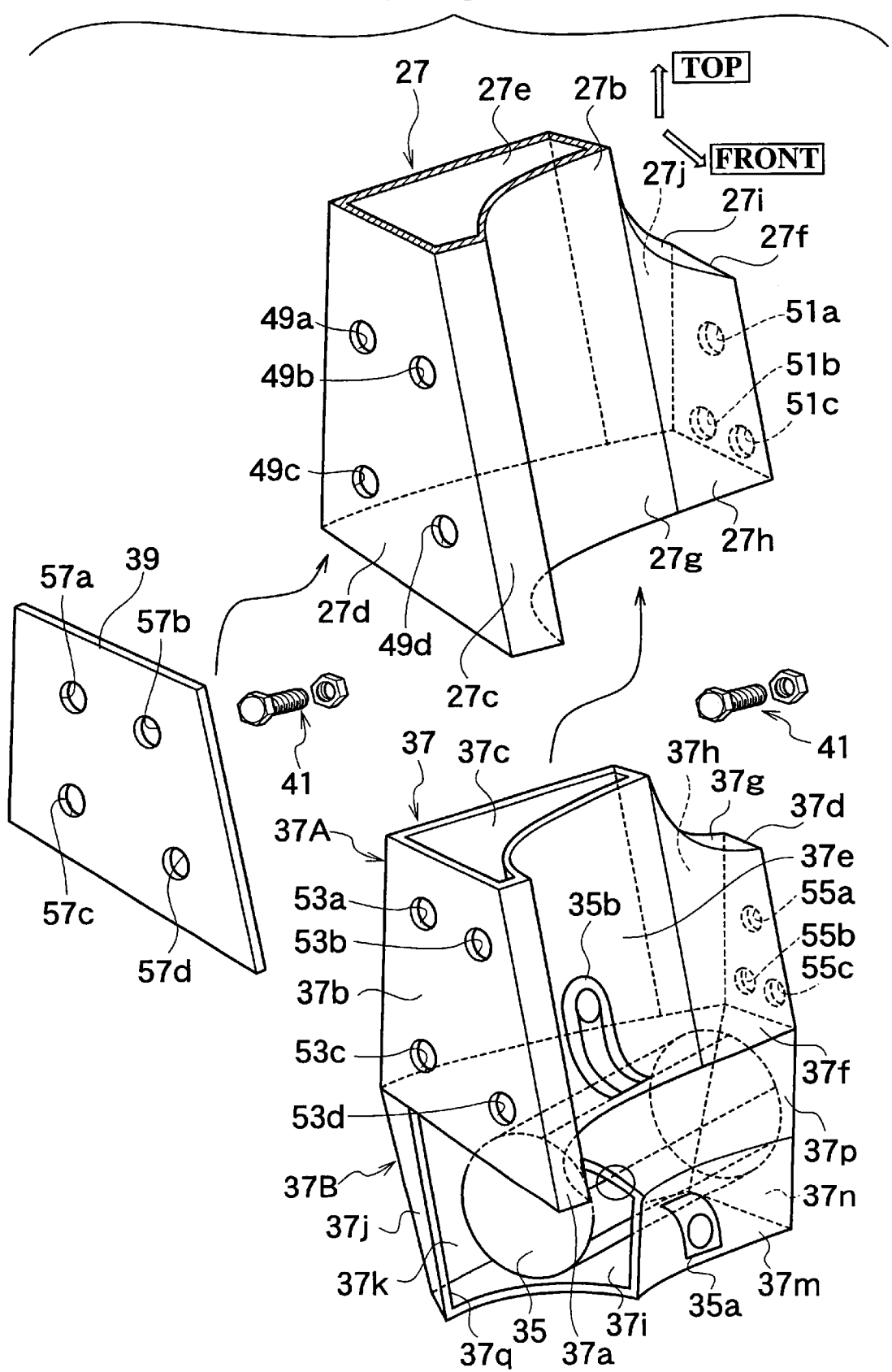
FIG. 3 is an exploded perspective view of the main parts of the first embodiment.

FIG. 2 is a perspective view showing the mounting relationship between the load transmission member 37, the lower part 27b of the longitudinal frame 27, and the recliner bracket 39, with this relationship shown also in an exploded perspective view by FIG. 3. As shown in FIG. 2 and FIG. 3, the lower part 27a of the longitudinal frame 27 is formed so as to be hollow, and has inclined receiving surfaces formed with the inner surfaces of the walls 27c, 27e, 27h, and 27i established so as to be inclined.

On the outside wall 27d of the lower part 27b are provided four through holes 49a, 49b, 49c, and 49d. The two front mounting holes 49b and 49d are disposed along the inclined receiving surface 27c, and the two rear mounting holes 49a and 49c are disposed at the top and bottom along the inclined receiving surface formed with the wall 27e. The inside wall 27f of the lower part 27b has three mounting holes 51a, 51b, and 51c.

The load transmission member 37 is formed box shaped so as to fix the seatbelt retractor 35, and so as to mate with the inside of the lower part 27b of the longitudinal frame 27, the cross-section of the mating part 37a being substantially the same as the lower part 27b of the longitudinal frame 27. Therefore, the walls 37a, 37b, 37c, 37d, 37e, 37f, and 37g of the load transmission member 37 correspond respectively to the walls 27c, 27d, 27e, 27f, 27g, 27h, and 27i of the lower part of the longitudinal frame 27, the inclination and curvature thereof being formed so as to be corresponding.

The walls 37a, 37c, 37f, and 37g of the load transmission member 37 are established so as to be inclined, the outer surfaces of which form inclined contact surfaces, these inclined contact surfaces coming into contact with the inclined receiving surfaces formed with the inclined walls 27c, 27e, 27h, and 27i of the lower part 27b of the longitudinal frame 27.

Joining holes 53a, 53b, 53c, and 53d, corresponding to the mounting holes 49a, 49b, 49c, and 49d, are provided in the outer wall 37b of the load transmission member 37. Three joining through holes 55a, 55b, and 55c are provided in the inner wall 37d of the load transmission member 37.

A retractor housing part 37b surrounded by the walls 37i, 37j, 37k, 37m, 37n, and 37p is formed at the lower part of the load transmission member 37, and an aperture 37q for the mounting of the retractor is also provided.

The seatbelt retractor 35 is housed in the aperture 37q, and the arms 35a and 35b thereof are mounted to the walls 37e and 37m of the load transmission member 37, using bolts and nuts (not shown in the drawing).

The recliner bracket 39 is formed so as to oppose the outer wall 27d of the lower part 27b of the longitudinal frame 27, and has through holes 57a, 57b, 57c, and 57d, which oppose the mounting holes 49a, 49b, 49c, and 49d.

The mating part 37a of the load transmission member 37 is inserted from the bottom side of the lower part 27b of the longitudinal frame 27, so that the joining holes 53a, 53b, 53c, 53d, 55a, 55b, and 55c of the load transmission member 37 are caused to oppose the mounting holes 49a, 49b, 49c, 49d, 51a, 51b, and 51c of the lower part 27b, the recliner bracket 39 being brought into contact from outside the outside wall 27d of the lower part 27d, joining and mounting being done with respective bolt and nut 41 fasteners at the through holes 57a, 57b, 57, and 57d, the mounting holes 49a, 49b, 49c, and 49d, and the joining holes 53a, 53b, 53c, and 53d. Joining is also done using bolts and nuts 41 at the mounting holes 51a, 51b, and 51c of the inside wall 27f of the lower part 27 and the joining holes 55a, 55b, and 55c of the load transmission member 37.

The arm 11a of the reclining apparatus 11 is also held at the mounting holes 49c and 49d, the joining holes 53c and 53d, and the through holes 57c and 57d.

In the above-noted condition, the inclined contacting surfaces of the walls 37a, 37c, 37f, and 37h of the load transmission member 37 come into contact with the inclined receiving surfaces of the walls 27c, 27e, 27h, and 27j of the lower part 27b, thereby establishing position.

In this configuration, if the vehicle experiences a collision, a shock detecting sensor of the seatbelt retractor 35 detects the shock, resulting in the emergency locking of the seatbelt retractor 35.

Figure 4:
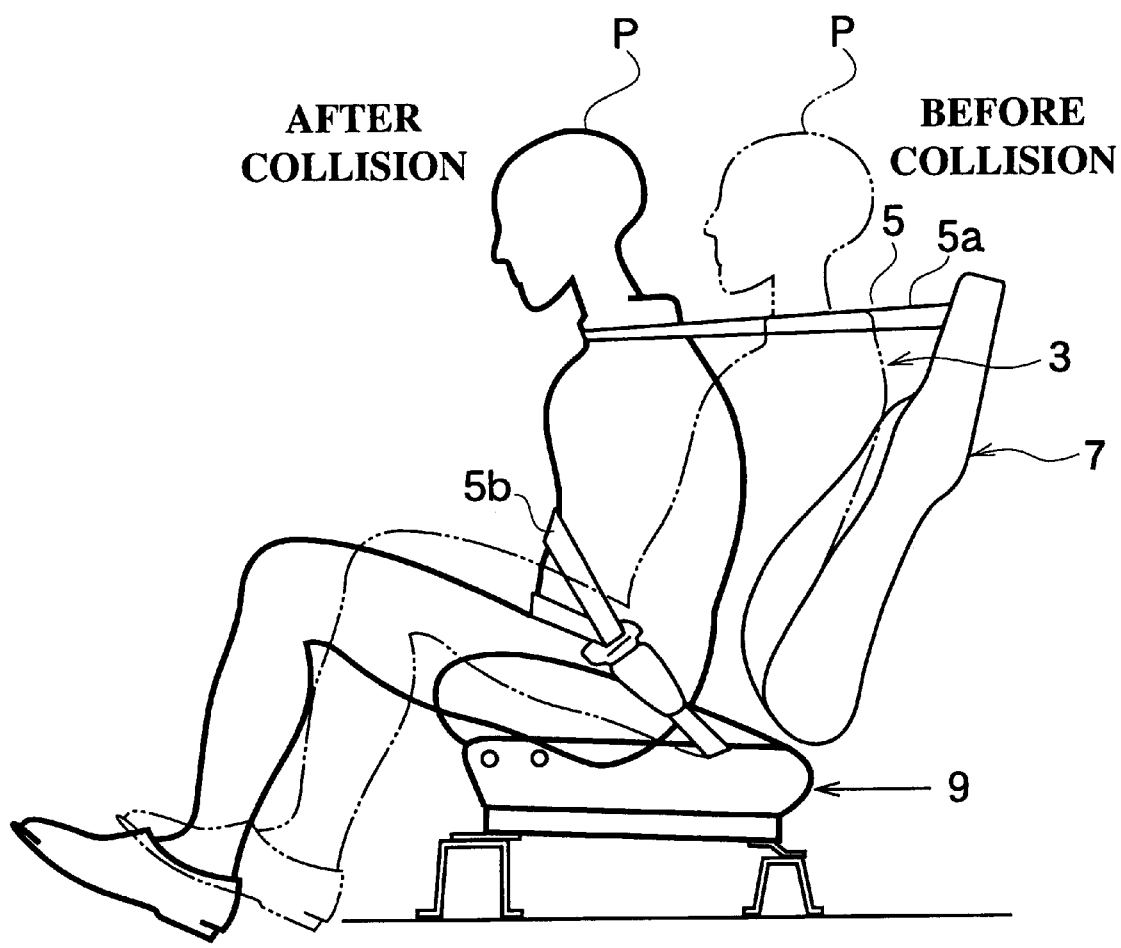
FIG. 4 is a side elevation showing the behavior of a passenger when a vehicle experiences a collision.
Figure 5:
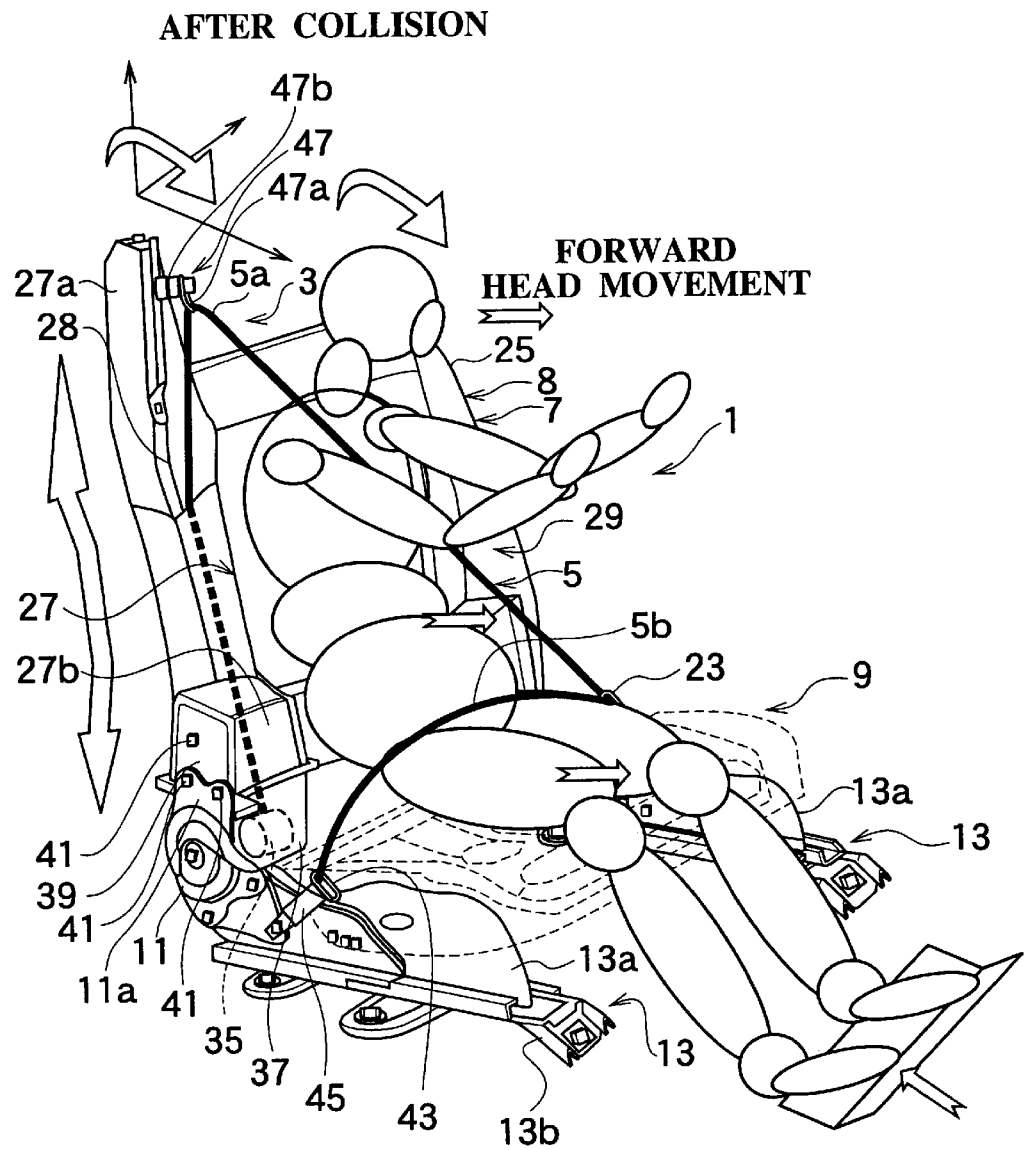
FIG. 5 is a perspective view showing the behavior of a passenger when a vehicle experiences a collision.

Next, when a passenger P moves forward with respect to the seat back 7, as shown in FIG. 4, tension occurs in the lap belt 5b and the shoulder belt 5a, thereby starting to restrain the passenger. When this occurs, via the through anchor 47a of the upper part 27a of one of the longitudinal frames 27 of the seat back fame 25 the excessive load acts to pull up the load transmission member 37 of the seatback retractor 35.

When the load transmission member 37 is pulled upward, by parts fastened by the bolts and nuts 41, and the contact between the inclined receiving surfaces 27c, 27e, 27g, and 27h, and the inclined contacting surfaces 37a, 37c, 37f, and 37h, this load is reliably transmitted upward at the lower part of the longitudinal frame 27.

By virtue of this action, between the through anchor 47a and the seatbelt retractor 35, the longitudinal frame 27 is compressed along the neutral axis. For this reason, most of the bending load acting on the seat back frame 8 is changed to axial load on the longitudinal frame 27, so that an excessive rotational torque is not applied to the reclining apparatus 11, thereby suppressing the application of the load to the seat sliding rail assembly 13.

Therefore, it is possible to achieve a seat sliding rail assembly 13, for example, that are small and light, and also to suppress forward inclination of the seat back 7, thereby improving the restraint of the passenger P.

Figure 6A:
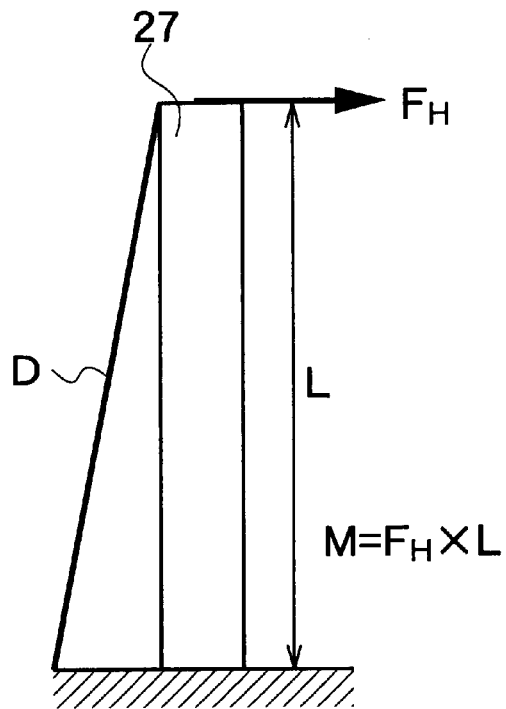
FIGS. 6A to 6D illustrate operations of the first embodiment of the present invention, FIG. 6A showing the pure bending load condition, FIG. 6B showing a pure bending load condition load distribution, FIG. 6C showing the pure compression load condition.

This can be further explained with reference to FIGS. 6A to 6D and FIGS. 7A and 7B. FIG. 6A shows the condition in which the lower end of a simplified longitudinal frame 27 is fixed, and a pure bending load FH is applied to the upper end thereof, the bending stress distribution being as indicated by D. If the length of the longitudinal frame 27 is L, the bending moment acting on the reclining apparatus 11 is M=FH×L. If we observe the transverse cross-section under this condition, there is a distribution of compressive load w1 on one side of the neutral axis C, and a distribution of tensile load w2 on the other side thereof.

Figure 6C:
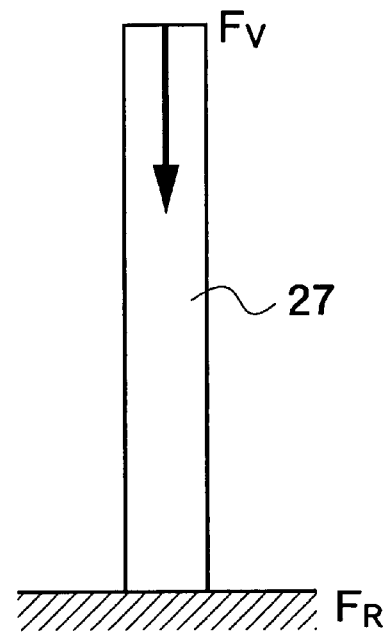
Figure 6B:
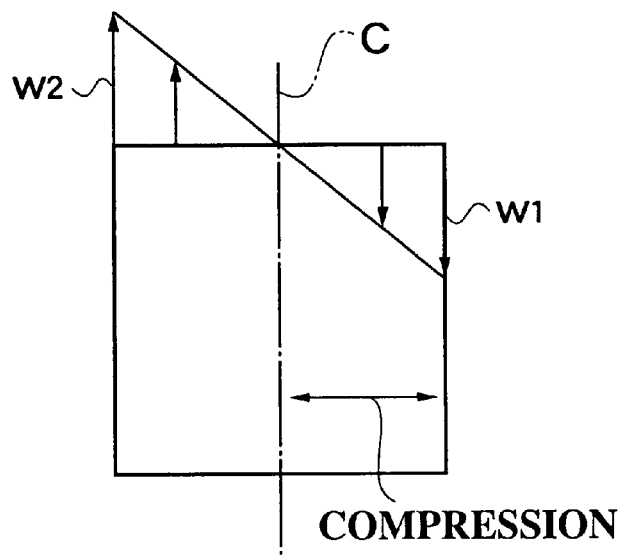
Figure 6D:
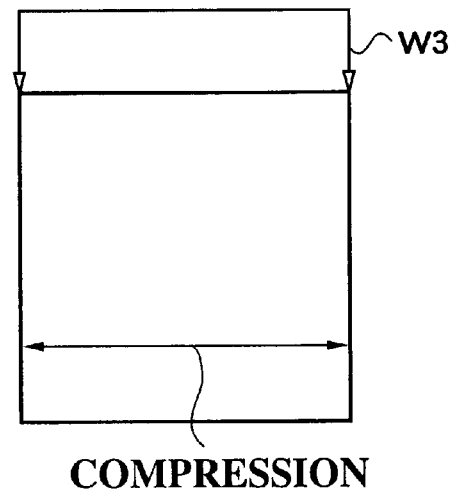

FIG. 6C shows the condition in which, in the same manner, a load FV acts on the longitudinal frame 27 to cause pure compression. Viewing the load distribution under this condition reveals, as shown in FIG. 6D, that there is an overall compression load w3 acting uniformly.

Figure 7A:
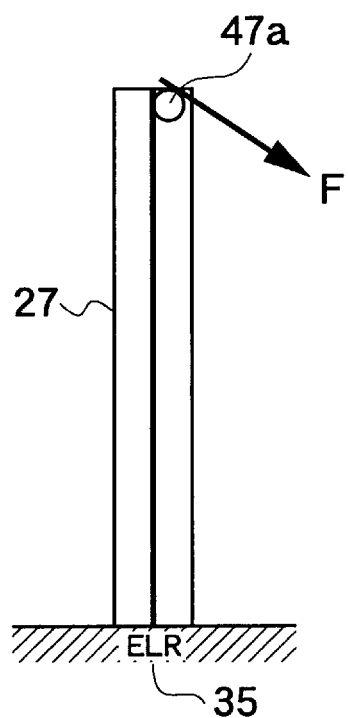
FIGS. 7A and 7B illustrate the first embodiment, FIG. 7A showing the load condition and FIG. 7B showing the load distribution condition.
Figure 7B:
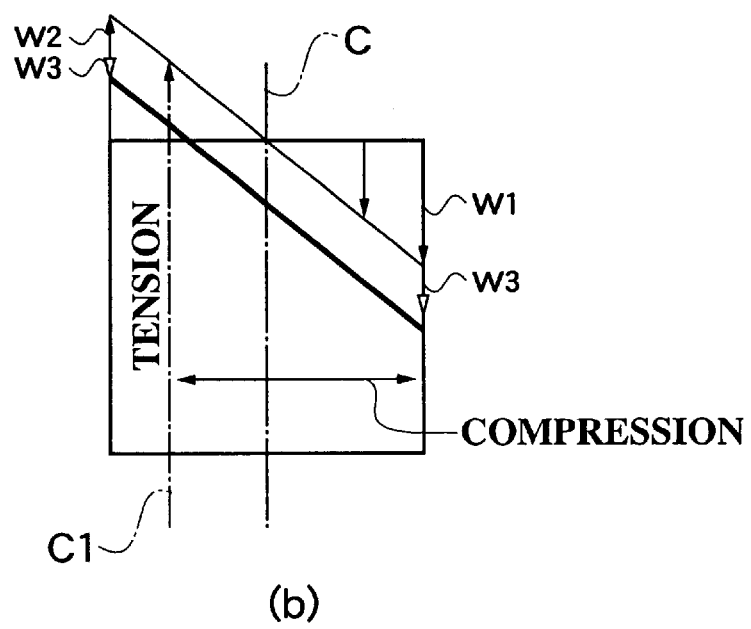

The first embodiment of the present invention is a combination of the pure bending condition shown in FIG. 6A and the pure compression condition shown in FIG. 6C. That is, as shown in FIG. 7A, in the first embodiment, with respect to the load F from the seatbelt, between the through anchor 47a serving as the upper part supporter and the seatbelt retractor 35, the tension of the seatbelt acts on the longitudinal frame 27, so that most of the bending load is changed to a compression load.

That is, a compression load w3 by pure compression is added to a compression-side load w1 applied by pure bending, and in the same manner on the pulling side the compression load w3 by pure compression is subtracted from the tensile load w2, the result being a shift of the neutral axis C toward C1, and an expansion of the surface area on the compression side.

That is, the action of the above-noted seatbelt retractor 35 and the disposition of the upper part supporter 47 is that of changing most of the bending load to an axial load on the longitudinal frame 27, thereby reliably achieving the above-noted operating effect.

According to the present embodiment, attachment of the seatbelt retractor is done via a load transmission member attached to the lower part of the longitudinal frame. Accordingly, the load that acts on the seatbelt retractor is transmitted to the lower part of the longitudinal frame via the load transmission member, thereby enabling further reliable transmission of the load in the compression direction of the longitudinal frame.

Moreover, in the embodiment, the load transmission member is fastened to be attached to the longitudinal frame via a fastening member. Accordingly, the load acting on the seatbelt retractor is reliably transmitted via the load transmission member that is fastened by a fastening member to the longitudinal frame.

Further, the load transmission member is configured in a box form to fix the seatbelt retractor. Accordingly, the load transmission member of a box form reliably transmits the load acting on the seatbelt retractor to the longitudinal frame.

Further, the longitudinal frame has at a lowermost part thereof a receiving surface configured to be in abutment with an abutment part provided on the load transmission member of the box form. Accordingly, the load on the seatbelt retractor is reliably transmitted to the receiving surface at the lowermost part of the longitudinal frame, from the abutment part of the load transmission member. Thus, the belt tension can be reliably transmitted in the compression direction of the longitudinal frame.

Further, the longitudinal frame is configured in a follow form with an inclined receiving surface at the lower part, the load transmission member has an inclined abutment surface for abutment with the inclined receiving surface, and the load transmission member is fitted to the lower part of the longitudinal frame to have the inclined abutment surface abutting on the inclined receiving surface. Accordingly, the load on the seatbelt retractor is transmitted to the inclined receiving surface of the longitudinal frame form the inclined surface of the load transmission member fitted to the lower part of the longitudinal frame, enabling reliable transmission of the load in the compression direction of the longitudinal frame, and when the load is transmitted, the load transmission member is positioned with respect to the bottom part of the longitudinal frame, thereby enabling more reliable load transmission.

Figure 8:
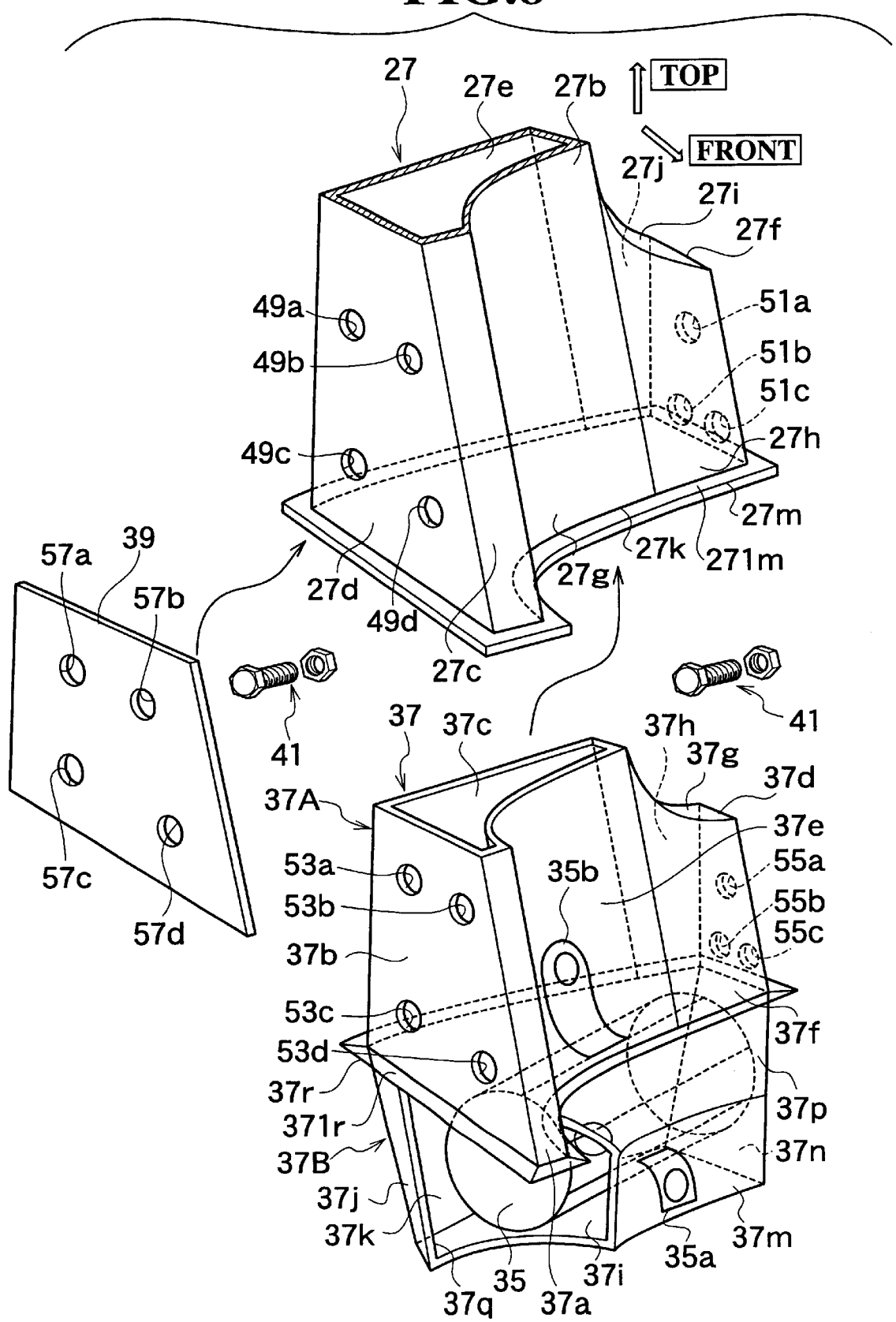
FIG. 8 is a partial exploded perspective view of the main parts of a second embodiment of the present invention.

FIG. 8 is an exploded perspective view showing the main parts of a second embodiment of the present invention, this drawing corresponding to FIG. 3, which shows the first embodiment. Constituent elements in FIG. 8 which correspond to elements in FIG. 3 having been assigned the same reference numerals, and will not be explicitly described herein.

In the second embodiment, there is an edge part 27k at the lowermost part of the lower part 27b of the longitudinal frame 27, a flat flange 27m around the periphery of the end part 27k forming a receiving surface 271m. The load transmission member 37 is provided with a flat flange 37r around the periphery of the mating part 37a thereof, this forming a contacting part 371r that makes contact with the receiving surface 271m of the flange 27m.

In this embodiment, therefore, when the mating part 37a of the load transmission member 37 mated and mounted to the lower part 27b of the longitudinal frame 27, there is a contact made between the edge part 27k of the lowermost part of the lower party 27 and the contacting part 371r of the flange 37r of the load transmission member 37.

In this configuration of the second embodiment, in addition to having the structure and achieving the operating effect of the first embodiment, there is additionally a contact made by the contacting part 37ar with the edge part 27k and the receiving surface 27am, so that load is transmitted, the result being that load from the seatbelt retractor 35 is reliably transmitted to the lower part 27b of the longitudinal frame 27 via the load transmission member 37, thereby reliably changing most of the bending load to an axial load.

According to the present embodiment, the longitudinal frame has at a lowermost part thereof an edge part configured to be in abutment with an abutment part provided on the load transmission member of the box form. Accordingly, it is possible to transmit the load acting on the seatbelt retractor from the load transmission member reliably to the longitudinal frame via an edge part at the lowermost part of the longitudinal frame. Thus, the belt tension can be reliably transmitted in the compression direction of the longitudinal frame.

It will be understood that, although this embodiment is described for the case in which the flanges 27m and 35r are flat, if the cross-sectional shapes thereof are made U-shaped, and mutual positioning is done between the flanges 27m and 37r, it is possible to achieve further reliable load transmission.

Figure 9:
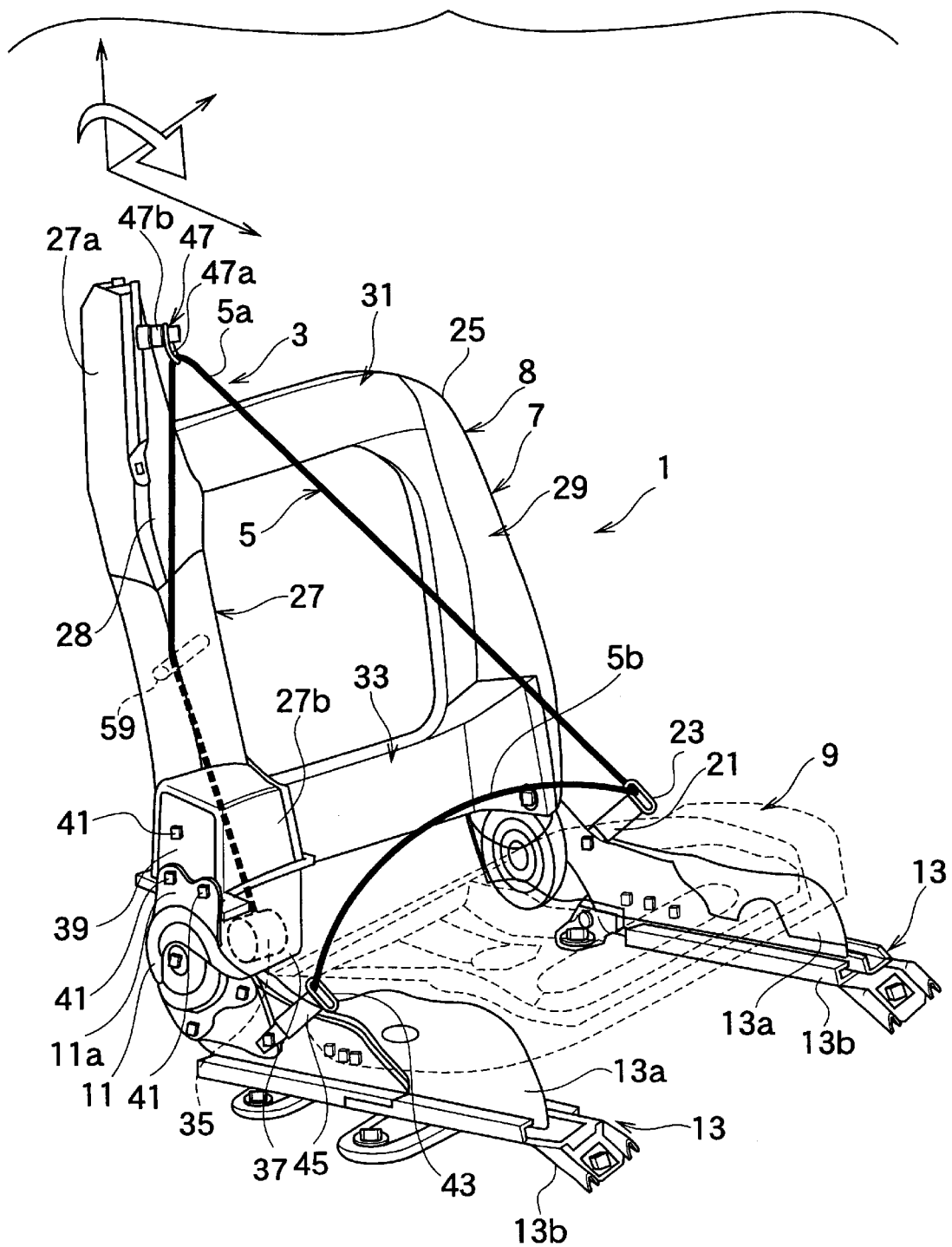
FIG. 9 is a partially simplified perspective view of a seat with an integral seatbelt according to a third embodiment of the present invention.
Figure 10:
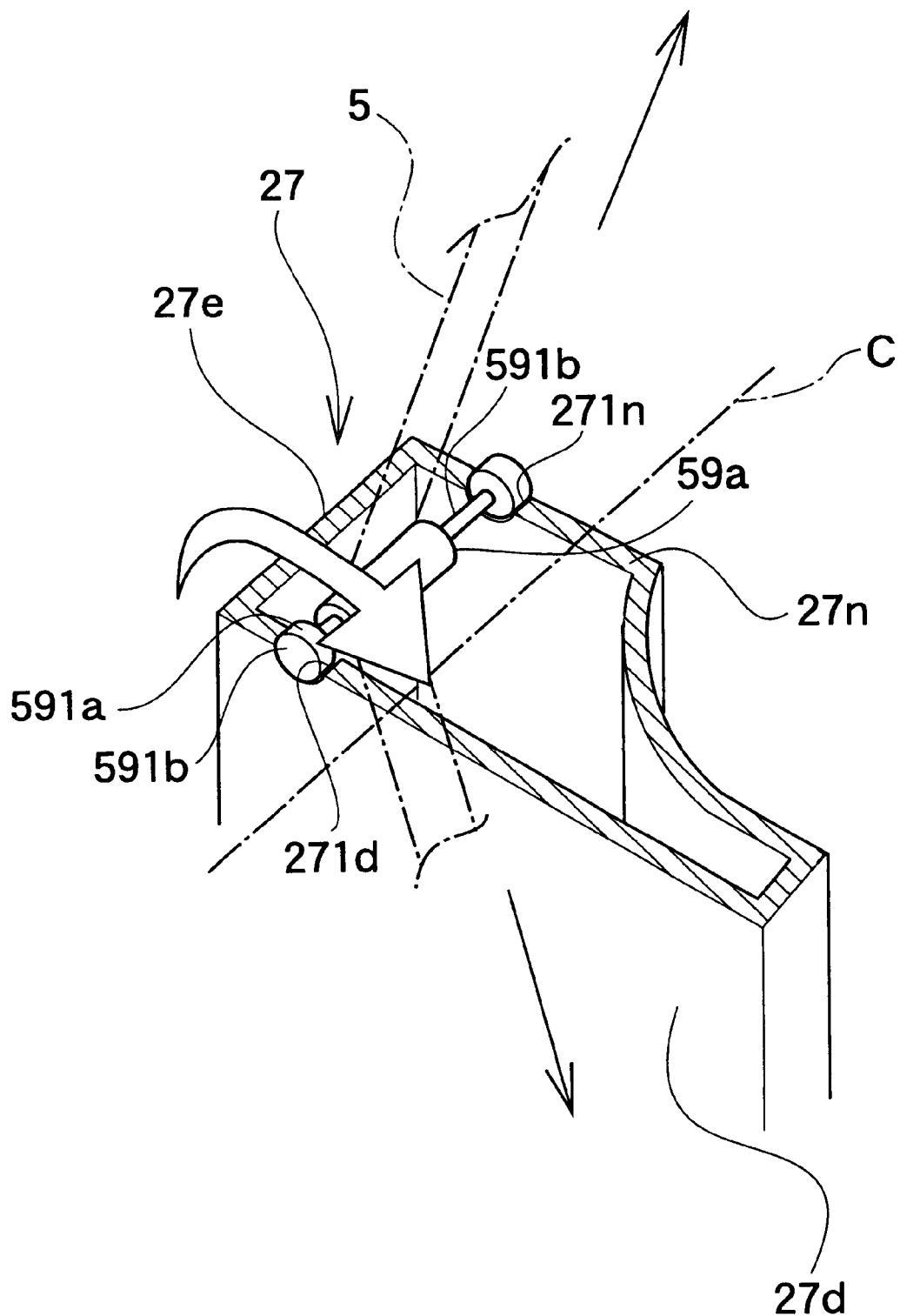
FIG. 10 is a partial cutaway perspective view showing the third embodiment.

FIG. 9 and FIG. 10 show a third embodiment of the present invention, FIG. 9 showing a partially simplified overall perspective view of this seat with an integral seatbelt, and FIG. 10 showing a cutaway perspective view of the main parts thereof.

In this embodiment, a charger 59 is provided in the longitudinal frame 27 for shifting the pulling around of the seatbelt 5.

In this embodiment, the charger 59 is implemented as a roller 59a, the shaft 591a of the roller 59 being rotatably supported by blocks 591b at both ends thereof, the blocks 591b being fixed in holes 271d and 271n formed in the inner wall 27n. The position of the roller 59a is removed from the neutral axis C of the longitudinal frame 27 and is on the side of the rear wall 27e, which is on the pulling side when belt tension acts.

When the roller 59a is installed, the integral assembly formed by the roller 59a, the shaft 591a and the blocks 591b is inserted from a hole 271d, for example, formed in the outer wall 27d, and the blocks 591b are fixed into the holes 271d and 271n.

In this embodiment, therefore, by the action of the roller, the pulling around of the seatbelt 5 can be done smoothly.

According to the present embodiment, the seat with an integral seatbelt has a changer spaced from a neutral axis of the longitudinal frame, to be at a pulling side with respect to the load acting, and configured to shift a wound track of the seatbelt between the seatbelt retractor and the upper part supporter. Accordingly, the charger enables better transmission of an excessive load from the seatbelt in the compression direction of the longitudinal frame, thereby suppressing forward movement of the seat back, whereby passenger restraint is greatly improved, and the increase in size as well as weight of seat sliding rail assembly is reliably prevented.

Figure 11A:
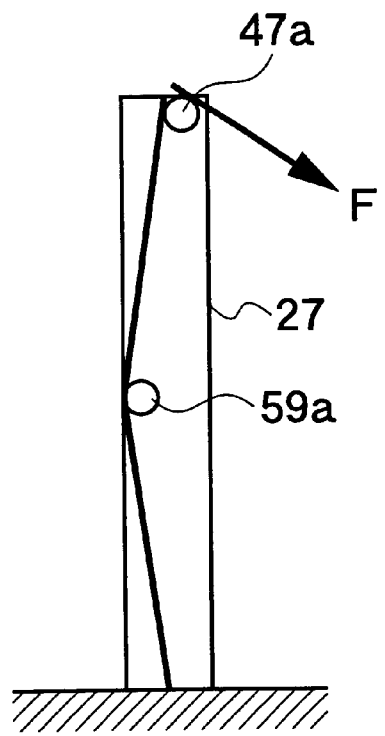
FIGS. 11A and 11B illustrate the third embodiment, FIG. 11A showing the load condition and FIG. 11B showing the load distribution condition.

FIG. 11A shows a simplified view of the above-noted structure, in which the roller 59a is mounted at the top and bottom center part of the longitudinal frame 27 at a position that is on the pulling side. Thus, when a load F acts on the seatbelt 5, the load distribution within the cross-section is as shown in FIG. 11B.

That is, there is distribution of a load w4 in addition to the loads w1, w2, and w3 for the case of a combined pure compression and pure bending load as shown in FIGS. 6A to 6D and FIGS. 7A and 7B with regard to the first embodiment. That is, when belt tension acts, the roller 59a is pressed toward the right as shown in FIG. 11A, so that there is a slight increase in the tensile load on the right side of the longitudinal frame 27 as shown in the drawing, and in the same manner an increase in compression load on the left side.

Figure 11B:
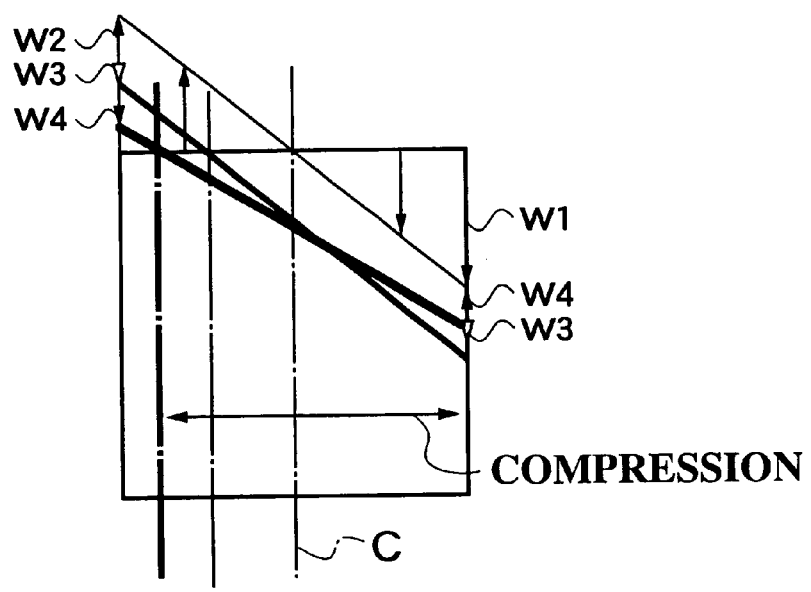

Showing this in FIG. 11B, the load w4 is subtracted from the compression load on the compression side and added on the pulling side. Therefore, there is a further enlarging of the compression region, resulting in a more uniform occurrence of compression load.

In this embodiment, therefore, in addition to achieving substantially the same effect as in the first embodiment, the compression load is made more uniform, thereby enabling suppression of a rotational torque in the reclining apparatus 11 and the achievement of small, lightweight seatbelt rails 13.

Further, according to the embodiment, the changer comprises a roller provided on the longitudinal frame. Accordingly, the seatbelt is pulled around by the roller, so that the seatbelt moves smoothly, thereby enabling reliable transmission of belt tension in the compression direction of the longitudinal frame.

Figure 12:
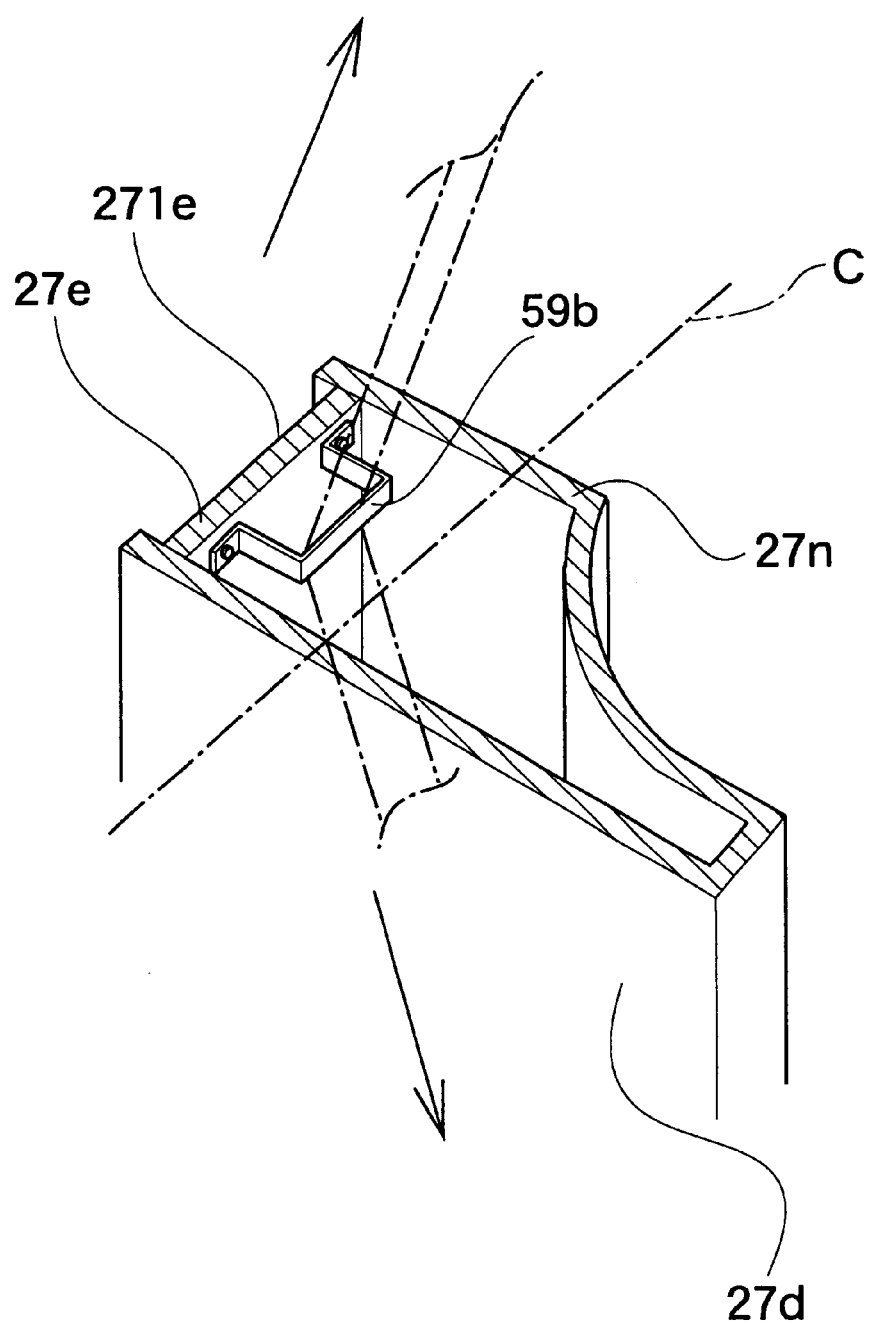
FIG. 12 is a partial cutaway perspective view showing a variation on the third embodiment.

FIG. 12 shows a modification of the above, in which a bracket 59b is used as a changer. This bracket 59b has a hat-shaped cross-section, and is fixed to the rear wall 27e of the longitudinal frame 27. The wall 27e has holes formed at this part, which is formed by a blocking member 271e to which the bracket 59b is priorly attached, and which is welded in place.

In a charger using a bracket such as shown in FIG. 12 as well, it is possible achieve the same type of effect as illustrated in FIG. 10. Additionally, by using the bracket 59b, it is possible to simplify the construction.

Figure 13A:
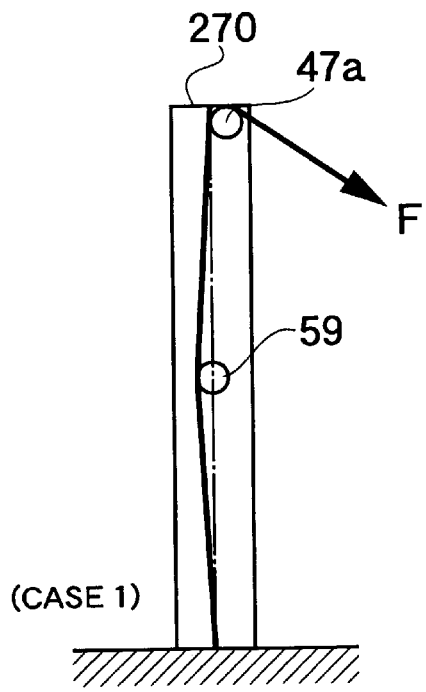
FIGS. 13A to 13D shows the condition of changing the position of the changer.
Figure 13B:
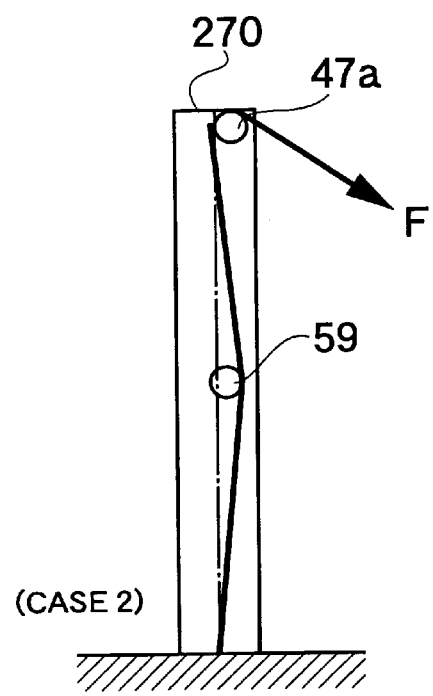
Figure 13C:
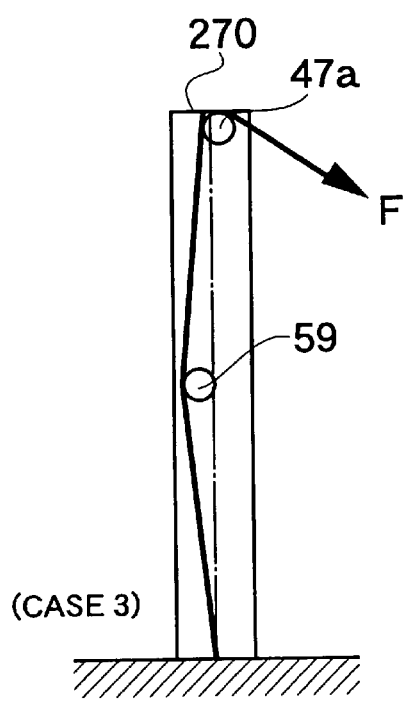
Figure 13D:
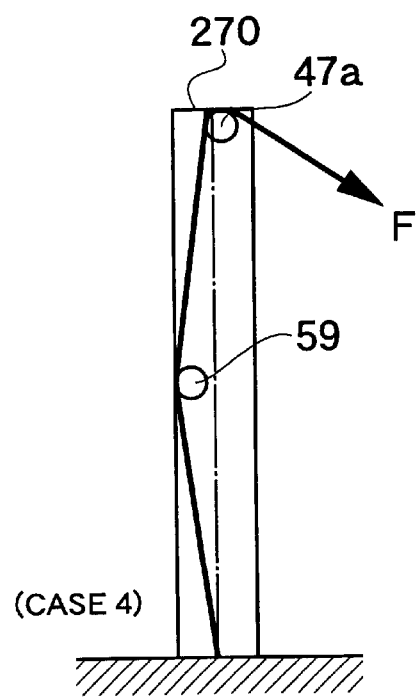
Figure 14:
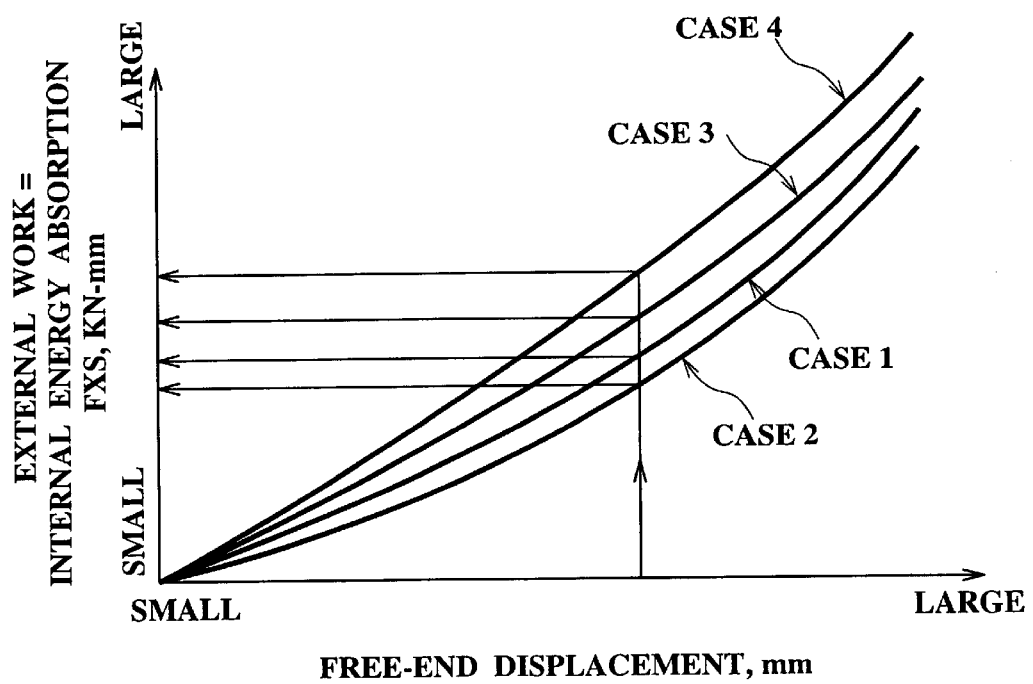
FIG. 14 is a graph showing a comparison between the relationship between amount of energy absorbed and the amount of flexure of the longitudinal frames.
Figure 15:
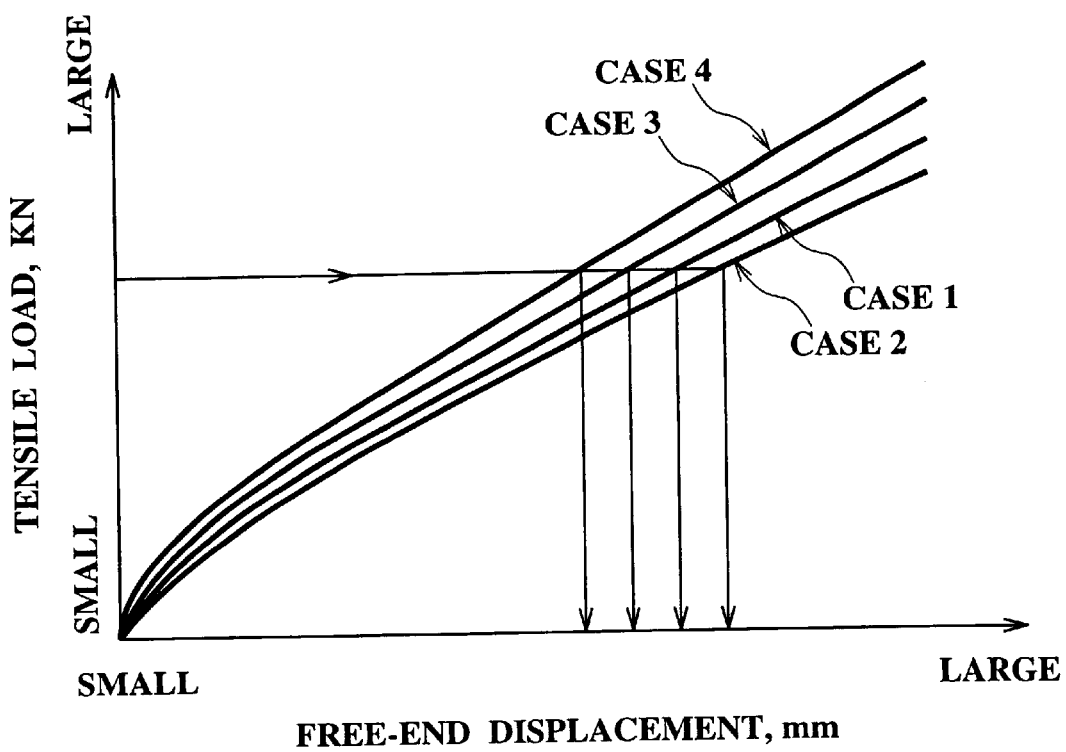
FIG. 15 is a graph showing a composition between the relationship between the amount of tensile load and the amount of flexure of the longitudinal frames.

FIGS. 13A to 13D show various cases of the positioning of the changer 59 and the neutral axis C, with FIG. 13D showing the condition of the third embodiment. In contrast to this, FIG. 13A shows the changer disposed on the neutral axis C, FIG. 13B shows it disposed slightly to the compression side from the neutral axis C, and FIG. 13C shows it disposed slightly to the pulling side from the neutral axis C. An examination of the internally absorbed energy FXS (KN-mm) for cases 1 to 4 shown in FIGS. 13A to 13D reveals the conditions shown in FIG. 14. As shown in FIG. 14, case 4 of this embodiment enables the best energy absorption. If we examine the free-end displacement of the tensile load F, we see that it is case 4 of this embodiment that has the smallest displacement. That is, accordingly to the above-noted embodiment, it is not only possible to greatly improve the initial passenger restraint, but also to achieve small size and light weight.

According to this embodiment, the changer comprises a bracket provided on the longitudinal frame. Accordingly, the seatbelt is pulled around by the bracket, thereby simplifying the construction.

Figure 16A:
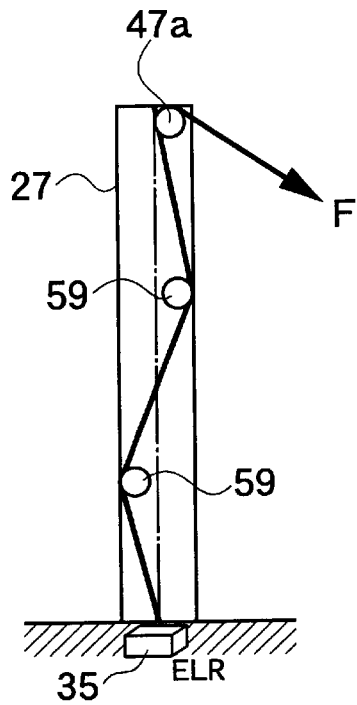
FIGS. 16A to 16C illustrate the third embodiment for cases in which there are a plurality of changers, FIG. 16A showing the case of two changers, FIG. 16B showing the case of two changers in a pattern that is the reverse of FIG. 16A, and FIG. 16C showing the case of three changers.
Figure 16B:
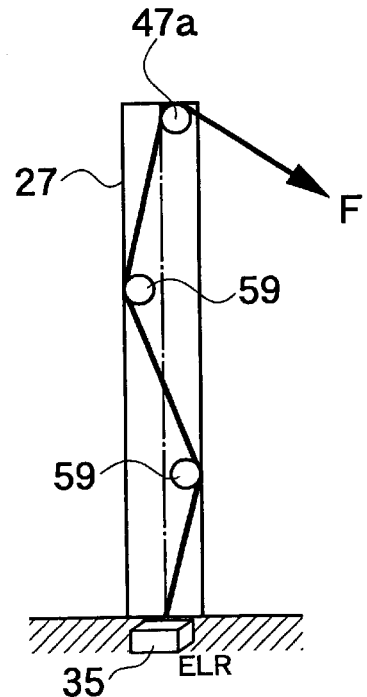
Figure 16C:
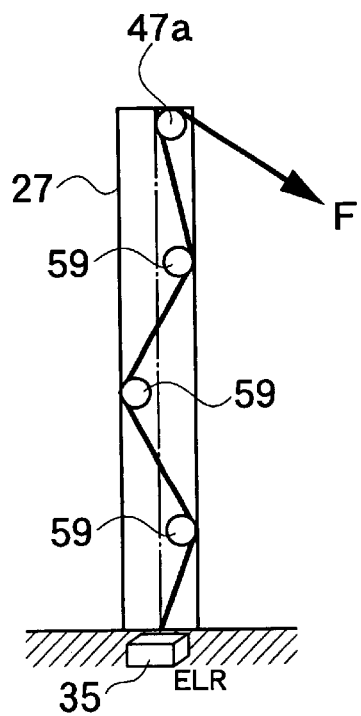

FIGS. 16A to 16D show the case of adding changers, with FIG. 16A showing the case in which a changer is disposed at the compression side at the lower side of the through anchor 47a and also at the pulling side at the lower side thereof. FIG. 16B shows the case in which a changer is disposed at the pulling side on the lower side of the through anchor 47a, and also at the pulling side at the lower side thereof, and further at the compression side at the lower side thereof. These changer configurations can be implemented as illustrated in FIG. 10 and FIG. 12.

By using a plurality of changers 59, it is possible to achieve further uniformity in the compression load, further suppression of forward tilting of the seat back 7, and further improvement in the compactness and lightness of the seat sliding rail assembly 13, for example.

Additionally, in a case in which a child seat is mounted to a seat with an integral seatbelt as described with regard to the foregoing embodiments, with the child seat held to the seat back 7 by the seat belt 5, even if the belt tension occurs in the seatbelt 5 by the action of a shock as noted above, because it is possible to greatly suppress the forward tilting of the seat back 7, it is possible to greatly reduce the amount of forward tilting of the child seat.

The contents of Japanese Patent Application No. 11-172968 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A seat with an integral seatbelt, comprising:
   a seat back frame including
      vertical longitudinal frames disposed in a left position and a right position to each other and linked respectively at lower parts thereof to a seat cushion frame end, and
      a transverse frame linking the vertical longitudinal frames to each other;
   a seatbelt retractor attached to a lower part of one of said vertical longitudinal frames and configured to provide an emergency locking;
   a seatbelt linked at one end thereof retractably to the seatbelt retractor, attached at another end thereof to the seat cushion frame end, and provided with an engagement member between the seatbelt retractor end and the seat cushion frame end;
   a locking member fixed to one of the vertical longitudinal frames and the seat cushion frame end and configured to disengageably lock the engagement member; and
   an upper part supporter provided at an upper part of the vertical longitudinal frame having the seatbelt retractor attached to the lower part thereof, and configured to support the seatbelt at a return point to the upper part supporter, wherein
   the vertical longitudinal frame having the seatbelt retractor attached to the lower part thereof has a hollow formed within a closed section, and the seatbelt retractor is mounted inside the hollow of the closed section, and the seatbelt penetrates the hollow of the closed section from the seatbelt retractor to the upper part supporter, and wherein
   the seatbelt retractor and the upper part supporter are arranged to transmit a load acting from the seatbelt on the upper part supporter, in a compression direction of the vertical longitudinal frame having the seatbelt retractor attached to the lower part thereof.

2. A seat with an integral seatbelt according to claim 1, further comprising a changer coupled to one of said vertical longitudinal frames and spaced from a neutral axis of the one of said longitudinal frames, and configured to shift a pulling direction of a wound track of the seatbelt between the seatbelt retractor and the upper part supporter.

3. A seat with an integral seatbelt according to claim 2, wherein the changer comprises a roller provided on the longitudinal frame.

4. A seat with an integral seatbelt according to claim 2, wherein the changer comprises a bracket provided on the longitudinal frame.

5. A seat with an integral seatbelt according to claim 1, wherein attachment of the seatbelt retractor is done via a load transmission member attached to the lower part of the longitudinal frame.

6. A seat with an integral seatbelt according to claim 5, wherein the load transmission member is fastened to be attached to the longitudinal frame via a fastening member.

7. A seat with an integral seatbelt according to claim 5, wherein the load transmission member is configured in a box form to fix the seatbelt retractor.

8. A seat with an integral seatbelt according to claim 5, wherein the longitudinal frame is configured in a follow form with an inclined receiving surface at the lower part, the load transmission member has an inclined abutment surface for abutment with the inclined receiving surface, and the load transmission member is fitted to the lower part of the longitudinal frame to have the inclined abutment surface abutting on the inclined receiving surface.

9. A seat with an integral seatbelt, comprising:
   a seat back frame including:
      vertical longitudinal frames disposed in a left position and a right position to each other and linked respectively at lower parts thereof to a seat cushion frame end, and
      a transverse frame linking the vertical longitudinal frames to each other;
   a seatbelt retractor attached to a lower part of one of said vertical longitudinal frames and configured to provide an emergency locking;
   a seatbelt linked at one end thereof retractably to the seatbelt retractor, attached at another end thereof to the seat cushion frame end, and provided with an engagement member between the seatbelt retractor end and the seat cushion frame end;
   a locking member fixed to one of the vertical longitudinal frames and the seat cushion frame end and configured to disengageably lock the engagement member; and
   an upper part supporter provided at an upper part of the vertical longitudinal frame having the seatbelt retractor attached to the lower part thereof, and configured to support the seatbelt at a return point to the upper part supporter, wherein the vertical longitudinal frame having the seatbelt retractor attached to the lower part thereof has a hollow formed within a closed section, and the seatbelt retractor is mounted inside the hollow of the closed section, and the seatbelt penetrates the hollow of the closed section from the seatbelt retractor to the upper part supporter, and wherein the seatbelt retractor and the upper part supporter are arranged to transmit a load acting from the seatbelt on the upper part supporter, in a compression direction of the vertical longitudinal frame having the seatbelt retractor attached to the lower part thereof.

10. A seat with an integral seatbelt, comprising:

a seat back frame including
  vertical longitudinal frames disposed in a left position and a right position to each other and linked respectively at lower parts thereof to a seat cushion frame end, and
  a transverse frame linking the vertical longitudinal frames to each other;

a seatbelt retractor attached to a lower part of one of said vertical longitudinal frames and configured to provide an emergency locking;

a seatbelt linked at one end thereof retractably to the seatbelt retractor, attached at another end thereof to the seat cushion frame end, and provided with an engagement member between the seatbelt retractor end and the seat cushion frame end;

a locking member fixed to one of the vertical longitudinal frames and the seat cushion frame end and configured to disengageably lock the engagement member; and an upper part supporter provided at an upper part of the vertical longitudinal frame having the seatbelt retractor attached to the lower part thereof, and configured to support the seatbelt at a return point to the upper part supporter, wherein the seatbelt retractor and the upper part supporter are arranged to transmit a load acting from the seatbelt on the upper part supporter, in a compression direction of the longitudinal frame having the seatbelt retractor attached to the lower part thereof, wherein attachment of the seatbelt retractor is done via a load transmission member attached to the lower part of the longitudinal frame, wherein the load transmission member is configured in a box form to fix the seatbelt retractor, and wherein the longitudinal frame has at a lowermost part thereof an edge part configured to be in abutment with an abutment part provided on the load transmission member of the box form.

11. A seat with an integral seatbelt, comprising:

a seat back frame including
  vertical longitudinal frames disposed in a left position and a right position to each other and linked respectively at lower parts thereof to a seat cushion frame end, and
  a transverse frame for linking the vertical longitudinal frames to each other;

a seatbelt retractor attached to a lower part of one of said vertical longitudinal frames and configured to provide an emergency locking;

a seatbelt linked at one end thereof retractably to the seatbelt retractor, attached at another end thereof to the seat cushion frame end, and provided with an engagement member between the seatbelt retractor end and the seat cushion frame end;

a locking member fixed to one of the vertical longitudinal frames and the seat cushion frame end, for disengageably lock the engagement member;

an upper part supporter provided at an upper part of the vertical longitudinal frame, for supporting the seatbelt at a return point to the upper part supporter; and means for transmitting a load acting from the seatbelt on the upper part supporter, in a compression direction of the longitudinal frame, wherein the vertical longitudinal frame having the seatbelt retractor attached to the lower part thereof has a hollow formed within a closed section, and the seatbelt retractor is mounted inside the hollow of the closed section, and the seatbelt penetrates the hollow of the closed section from the seatbelt retractor to the upper part supporter.

* * * * *